(12) United States Patent
Omura et al.

(10) Patent No.: US 10,260,125 B2
(45) Date of Patent: Apr. 16, 2019

(54) HIGH-STRENGTH AUSTENITIC STAINLESS STEEL FOR HIGH-PRESSURE HYDROGEN GAS

(71) Applicant: NIPPON STEEL & SUMITOMO METAL CORPORATION, Tokyo (JP)

(72) Inventors: Tomohiko Omura, Tokyo (JP); Jun Nakamura, Tokyo (JP); Hirokazu Okada, Tokyo (JP); Hiroyuki Semba, Tokyo (JP); Yusaku Tomio, Tokyo (JP); Hiroyuki Hirata, Tokyo (JP); Masaaki Igarashi, Tokyo (JP); Kazuhiro Ogawa, Tokyo (JP); Masaaki Terunuma, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/194,662

(22) Filed: Jun. 28, 2016

(65) Prior Publication Data
US 2016/0304983 A1    Oct. 20, 2016

Related U.S. Application Data

(63) Continuation of application No. 14/007,992, filed as application No. PCT/JP2012/057001 on Mar. 19, 2012.

(30) Foreign Application Priority Data

Mar. 28, 2011 (JP) ................. 2011-070045

(51) Int. Cl.
| | | |
|---|---|---|
| C21D 9/46 | (2006.01) |
| C22C 38/00 | (2006.01) |
| C22C 38/02 | (2006.01) |
| C22C 38/06 | (2006.01) |
| C22C 38/42 | (2006.01) |
| C22C 38/44 | (2006.01) |
| C22C 38/46 | (2006.01) |
| C22C 38/48 | (2006.01) |
| C22C 38/50 | (2006.01) |
| C22C 38/58 | (2006.01) |
| C22C 38/52 | (2006.01) |
| C22C 38/54 | (2006.01) |
| C21D 6/00 | (2006.01) |
| C21D 8/02 | (2006.01) |
| C21D 1/26 | (2006.01) |
| F16L 9/02 | (2006.01) |

(52) U.S. Cl.
CPC ............. *C21D 9/46* (2013.01); *C21D 1/26* (2013.01); *C21D 6/004* (2013.01); *C21D 6/005* (2013.01); *C21D 6/008* (2013.01); *C21D 8/0226* (2013.01); *C21D 8/0236* (2013.01); *C21D 8/0247* (2013.01); *C22C 38/001* (2013.01); *C22C 38/002* (2013.01); *C22C 38/004* (2013.01); *C22C 38/005* (2013.01); *C22C 38/02* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/58* (2013.01); *F16L 9/02* (2013.01); *C21D 2211/001* (2013.01); *C21D 2211/004* (2013.01)

(58) Field of Classification Search
CPC .... C21D 1/26; C21D 2211/001; C21D 6/004; C21D 8/0236; C22C 38/001
USPC .......................................... 420/40
See application file for complete search history.

(56) References Cited

U.S. PATENT DOCUMENTS

| | | | |
|---|---|---|---|
| 4,559,090 A * | 12/1985 | Grutzner | C21D 6/02 148/325 |
| 7,531,129 B2 | 5/2009 | Igarashi | |
| 2003/0177617 A1* | 9/2003 | Kita | A44B 1/02 24/415 |

FOREIGN PATENT DOCUMENTS

| | | |
|---|---|---|
| CA | 2464856 | 10/2004 |
| CN | 1697890 | 11/2005 |
| CN | 1697891 | 11/2005 |
| CN | 1833043 | 9/2006 |
| CN | 101151394 | 3/2008 |
| EP | 1 605 072 | 12/2005 |
| EP | 1 867 743 | 12/2007 |
| JP | 60-194016 | 10/1985 |
| JP | 2006-070314 | 3/2006 |
| JP | 2006-233281 | 9/2006 |
| JP | 2009-299174 | 12/2009 |
| JP | 2010-121190 | 6/2010 |
| WO | 2004/083476 | 9/2004 |
| WO | 2004/083477 | 9/2004 |
| WO | 2004/111285 | 12/2004 |

OTHER PUBLICATIONS

NPL-1: ASTM Table E112-96 (2004).

* cited by examiner

*Primary Examiner* — Jie Yang
(74) *Attorney, Agent, or Firm* — Clark & Brody

(57) ABSTRACT

There is provided an austenitic stainless steel for high-pressure hydrogen gas consisting, by mass percent, of C: 0.10% or less, Si: 1.0% or less, Mn: 3% or more to less than 7%, Cr: 15 to 30%, Ni: 10% or more to less than 17%, Al: 0.10% or less, N: 0.10 to 0.50%, and at least one kind of V: 0.01 to 1.0% and Nb: 0.01 to 0.50%, the balance being Fe and impurities, wherein in the impurities, the P content is 0.050% or less and the S content is 0.050% or less, the tensile strength is 800 MPa or higher, the grain size number (ASTM E112) is No. 8 or higher, and alloy carbo-nitrides having a maximum diameter of 50 to 1000 nm are contained in the number of $0.4/\mu m^2$ or larger in cross section observation.

6 Claims, No Drawings

HIGH-STRENGTH AUSTENITIC STAINLESS STEEL FOR HIGH-PRESSURE HYDROGEN GAS

This application is a Continuation of U.S. Ser. No. 14/007,992 filed on Sep. 27, 2013, which is a national phase of PCT/JP2012/057001 filed on Mar. 19, 2012, which is published as WO2012/132992 on Oct. 4, 2012.

TECHNICAL FIELD

The present invention relates to a high-strength stainless steel for high-pressure hydrogen gas, which has a tensile strength of 800 MPa or higher, and has excellent mechanical properties in a high-pressure hydrogen gas environment.

BACKGROUND ART

In recent years, the development of fuel-cell vehicles that run using hydrogen as the fuel and researches on practical hydrogen stations for supplying hydrogen to fuel-cell vehicles have been advanced. A stainless steel is one of candidate materials used for these applications; still, in a high-pressure hydrogen gas environment, the stainless steel may be susceptible to embrittlement caused by hydrogen gas (hydrogen environment embrittlement). In accordance with the Exemplified Standards of Compressed Hydrogen Vehicle Container stipulated in the High Pressure Gas Safety Act, the use of austenitic SUS316L is approved as a stainless steel that is not susceptible to hydrogen embrittlement.

In consideration of the necessity for reduced weight of fuel-cell vehicle and for high-pressure operation of hydrogen station, however, for a stainless steel used for a container and a pipe, there has been a need for stainless steel that has a strength higher than that of the existing SUS316L, especially has a tensile strength of 800 MPa or higher and is not susceptible to hydrogen environment embrittlement in a hydrogen gas environment. That is, assuming the use of high-pressure hydrogen of about 70 MPa, it is estimated that the SUS316L requires a pipe and container to have a wall thickness of 20 mm or larger, which leads to a significant increase in empty vehicle weight, so that higher strength of steel is indispensable.

As a method for enhancing the strength of steel, cold rolling can be cited as a typical method. Patent Document 1 gives a description concerning the cold rolling and the hydrogen environment embrittlement property of austenitic stainless steel.

As means for strengthening the austenitic stainless steel and improving the hydrogen embrittlement property of the austenitic stainless steel without relying on strengthening by cold rolling, Patent Documents 2 and 3 propose high-strength stainless steels for high-pressure hydrogen gas, in which precipitation strengthening by means of fine nitrides is utilized.

Patent Document 2 proposes a high-strength austenitic stainless steel in which 7 to 30% of Mn, 15 to 22% of Cr, and 5 to 20% of Ni are contained as principal components, and Patent Document 3 proposes a high-strength austenitic stainless steel in which 3 to 30% of Mn, more than 22% to 30% or less of Cr, and 17 to 20% of Ni are contained as principal components. These Documents indicate that a tensile strength of 800 MPa or higher can be realized in a state of solid solution heat treatment.

CITATION LIST

Patent Document

[Patent Document 1] WO 2004/111285
[Patent Document 2] WO 2004/083477
[Patent Document 3] WO 2004/083476

SUMMARY OF INVENTION

Technical Problem

In Patent Document 1, the influence of cold rolling on the hydrogen environment embrittlement has also been studied for SUS316L, in which it is verified that the cold rolling in the reduction of area of 30% or less does not have a great influence on the hydrogen environment embrittlement property, indicating the possibility that a tensile strength of about 800 MPa can be realized by cold rolling in the reduction of area of 20 to 30%. However, the high-strength austenitic stainless steel has a problem of the decrease in elongation and in hydrogen environment embrittlement property by cold rolling. The invention described in Patent Document 1 discloses, as measures against this problem, a technique in which cold rolling is performed at two or more stages, and by performing cold rolling in different rolling directions, the decrease in hydrogen environment embrittlement property and the decrease in elongation are restrained; however, the application of this invention inevitably requires considerably complicated cold rolling.

Further, in the case where a cold-rolled material is welded, local softening may be caused by welding heat affect. Therefore, it is difficult to join the materials by a welded joint, and the joint of the materials is restricted to a mechanical joint. To reduce the weight of fuel-cell vehicle or to streamline the piping system for the hydrogen station, there has been a strong need for a stainless steel that has a high strength and has no problem even if being welded. In this case, such means for achieving strengthening by cold rolling is difficult to apply in some respects.

The austenitic stainless steels described in Patent Documents 2 and 3 realize a high strength of 800 MPa or higher in a state after solid solution heat treatment. However, in Patent Document 2, when the Mn content is less than 7%, a sufficient hydrogen environment embrittlement property cannot be obtained, and a sufficient strength cannot be realized in a state of solid solution heat treatment. Also, in the steel relating to Patent Document 3, both of Cr concentration and Ni concentration are considerably high, so that this steel has a disadvantage of considerably high alloy cost.

The austenitic stainless steel described in Patent Document 2 can be produced at a somewhat low alloy cost as compared with the steel described in Patent Document 3. Therefore, if the stainless steel can be used in high-pressure hydrogen applications even if the stainless steel has low content of Mn of less than 7% as compared with Patent Document 2, an advantage is brought about in industrial production, since the steels of this Mn content range have been used conventionally in applications such as the nuclear field, and a common ingot can be used.

The present invention has been made in view of the present situation, and accordingly an objective thereof is to provide an austenitic stainless steel that has a high strength such that the tensile strength is 800 MPa or higher and is excellent in hydrogen environment embrittlement property in the composition range of less than 7% of Mn, which austenitic stainless steel has not been realized in Patent Document 2.

Solution to Problem

The present inventors conducted various studies to solve the problem, and resultantly obtained the findings described in items (a) to (d) below.

(a) By utilizing nitrogen as a solute element, the strength of stainless steel can be enhanced. However, the addition of a large amount of nitrogen decreases the stacking fault energy, and therefore has an adverse influence such that the distortion at the deformation time is localized, and the durability against hydrogen environment embrittlement is decreased.

(b) By making grains fine, the resistance to hydrogen environment embrittlement of high-nitrogen steel can be enhanced. As a method for making grains fine, there is a method in which by precipitating fine alloy carbo-nitrides at the time of final solid solution heat treatment, the growth of grains is restrained by the pinning effect. In order to produce fine carbo-nitrides and to make the grains of high-nitrogen steel fine, it is most effective to add V or Nb. However, in the conventional method, although V and Nb precipitate as nitrides, V and Nb agglomerate and coarsen because of a small amount of precipitate nucleus, so that the pinning effect cannot be achieved sufficiently.

(c) As a method for solving this problem, as production process involving solid solution heat treatment, cold rolling, and secondary heat treatment is effective. In the initial solid solution heat treatment, the alloying elements are dissolved sufficiently. In the next cold rolling step, distortion is given, whereby the amount of precipitate nucleus of carbo-nitrides precipitating at the time of the next secondary heat treatment is increased, the carbo-nitrides are precipitated finely, and the grains are made fine.

(d) That is, in an alloy system having a Mn content lower than that of Patent Document 2, by performing cold rolling at an intermediate stage of two heat treatments, the precipitation of carbo-nitrides is stimulated, and by the resultant refinement effect of austenite grains and the precipitation strengthening action due to the precipitation itself of carbo-nitrides, a high strength can be attained, and also the resistance to hydrogen environment embrittlement can be enhanced.

The present invention has been completed based on the findings, and the gists thereof are austenitic stainless steels for high-pressure hydrogen gas described in items (1) to (3) below.

(1) An austenitic stainless steel for high-pressure hydrogen gas consisting, by mass percent, of C: 0.10% or less, Si: 1.0% or less. Mn: 3% or more to less than 7%, Cr: 15 to 30%, Ni: 10% or more to less than 17%, Al: 0.10% or less. N: 0.10 to 0.50%, and at least one kind of V: 0.01 to 1.0% and Nb: 0.01 to 0.50%, the balance being Fe and impurities, wherein in the impurities, the P content is 0.050% or less and the S content is 0.050% or less, the tensile strength is 800 MPa or higher, the grain size number (ASTM E112) is No. 8 or higher, and alloy carbo-nitrides having a maximum diameter of 50 to 1000 nm are contained in the number of $0.4/\mu m^2$ or larger in cross section observation.

(2) An austenitic stainless steel for high-pressure hydrogen gas consisting, by mass percent, of C: 0.10% or less, Si: 1.0% or less, Mn: 3% or more to less than 7%, Cr: 15 to 30%. Ni: 10% or more to less than 17%, Al: 0.10% or less. N: 0.10 to 0.50%, and at least one kind of V: 0.010 to 1.0% and Nb: 0.01 to 0.50%, further containing one or more kinds of elements of at least one group selected from element groups of a first group to a fourth group described below, the balance being Fe and impurities, wherein in the impurities, the P content is 0.050% on less and the S content is 0.050% or less, the tensile strength is 800 MPa or higher, the grain size number (ASTM E112) is No. 8 or higher, and alloy carbo-nitrides having a maximum diameter of 50 to 1000 nm are contained in the number of $0.4/\mu m^2$ or larger in cross section observation.

First group elements . . . Mo: 0.3 to 3.0% and W: 0.3 to 6.0%
Second group elements . . . Ti: 0.001 to 0.5%, Zr: 0.001 to 0.5%, Hf: 0.001 to 0.3%, and Ta: 0.001 to 0.6%
Third group elements . . . B: 0.0001 to 0.020%, Cu: 0.3 to 5.0%, and Co: 0.3 to 10.0%
Fourth group elements . . . Mg: 0.0001 to 0.0050%, Ca: 0.0001 to 0.0050%, La: 0.0001 to 0.20%, Ce: 0.0001 to 0.20%, Y: 0.0001 to 0.40%, Sm: 0.0001 to 0.40%, Pr: 0.0001 to 0.40%, and Nd: 0.0001 to 0.50%

(3) The austenitic stainless steel for high-pressure hydrogen gas described in item (1) or (2), wherein the austenitic stainless steel is subjected to solid solution heat treatment at a temperature of 1100 to 1200° C. next being subjected to cold rolling in which the reduction of area is 20% or more, and thereafter is again subjected to heat treatment in the temperature range of 900° C. or higher and lower than the solution treatment temperature.

Advantageous Effect of Invention

According to the present invention, there can be provided a high-strength austenitic stainless steel that has a tensile strength of 800 MPa or higher and is excellent in hydrogen environment embrittlement property in the composition region of less than 7% of Mn.

DESCRIPTION OF EMBODIMENT

The reasons for restricting the chemical composition and metal micro-structure of a steel plate in the present invention are as follows:

(A) Chemical Composition of Steel

The operational advantages of each component of steel and the preferable content of each component are described below. The symbol "%" concerning the content of each element means "mass percent".

C: 0.10% or Less

In the present invention, C (carbon) is not an element that is added positively. If the C content is more than 0.10%, carbides precipitate at the gram boundaries, and exert an adverse influence on toughness and the like. Therefore, the C content is restrained to 0.10% or less. The C content is preferably 0.04% or less, further preferably 0.02% or less. The C content should be as low as possible. However, the extreme reduction in C content leads to an increase in refining cost, so that it is desirable to make the C content 0.001% or more in practical application.

Si: 1.0% or Less

If Si (silicon) is contained in large amounts, Si forms an intermetallic compound with Ni, Cr, or the like, or promotes the formation of an intermetallic compound such as sigma phase, so that, in some cases, the hot workability is decreased remarkably. Therefore, the Si content is 1.0% or less. Preferably, the Si content is 0.5% or less. The Si content should be as low as possible. However, considering the refining cost, it is desirable to make the Si content 0.01% or more.

Mn: 3% or More to Less than 7%

Mn (manganese) is an inexpensive austenite stabilizing element. In the steel of the present invention, due to a proper combination with Cr, Ni, N, and the like, Mn contributes to the enhancement of strength and the improvement in ductility and toughness. The present invention also has an aim of finely precipitating carbo-nitrides and making the grains fine. In the case where the amount of dissolved N is small, even if the steel undergoes the later-described process consisting of solid solution heat treatment, cold rolling, and secondary heat treatment, carbo-nitrides having a sufficient number density cannot be precipitated, and it becomes difficult to enhance the strength due to finer austenite grains. Therefore, 3% or more of Mn must be contained. If the Mn content is 7% or more, the technique described in Patent Document 2 can be applied. Therefore, in the present invention, the upper limit of the Mn content is less than 7%. For these reasons, the Mn content is specified so as to be 3% or more to less than 7%. The preferable lower limit of the Mn content is 4%. Also, the Mn content is effective when being 6.5% or less, especially effective when being 6.2% or less.

Cr: 15 to 30%

Cr (chromium) is an essential component because it is an element for ensuring corrosion resistance as a stainless steel. The Cr content must be 15% or more. However, if the Cr content is excessively high, coarse carbides such as $M_{23}C_6$, which decrease the ductility and toughness, are easily thrilled in large amounts. Therefore, the proper Cr content is 15 to 30%. The Cr content is preferably 18 to 24%, further preferably 20 to 23.5%.

Ni: 10% or More to Less than 17%

Ni (nickel) is added as an austenite stabilizing element. In the steel of the present invention, due to a proper combination with Cr, Mn, N, and the like, Ni contributes to the enhancement of strength and the improvement in ductility and toughness. Therefore, the Ni content is 10% or more. However, if the Ni content is 17% or more, the effect saturates, and the material cost increases. For these reasons, the proper Ni content is 10% or more to less than 17%. The Ni content is preferably 11 to 15%, further preferably 11.5 to 13.5%.

Al: 0.10% or Less

Al (aluminum) is an important element as a deoxidizer. However, if the Al content is more than 0.10% and Al remains in large amounts, the formation of an intermetallic compound such as sigma phase is promoted. Therefore, to attain both of the strength and toughness intended by the present invention, the Al content must be restricted to 0.10% or less. In order to reliably achieve the deoxidizing effect, the Al content is desirably 0.001% or more. The Al content is preferably 0.05% or less, further preferably 0.03% or less. In this description, Al means so-called "sol. Al (acid soluble Al)".

N: 0.10 to 0.50%

N (nitrogen) is the most important solid-solution strengthening element, and at the same time, in the present invention, makes the grains fine due to the formation of fine alloy carbo-nitrides, contributing to the enhancement of strength. To utilize N for the enhancement of strength, 0.10% or more of N must be contained. However, if the N content is more than 0.50%, coarse nitrides are formed, and therefore the mechanical properties such as toughness decrease. Therefore, the N content is 0.10 to 0.50%. The lower limit of the N content is preferably 0.20%, further preferably 030%.

V: 0.01 to 1.0% and/or Nb: 0.01 to 0.50%

V (vanadium) and Nb (niobium) are important elements in the steel of the present invention. To promote the formation of alloy carbo-nitrides and to contribute to finer grains, either one or both of V and Nb must be contained. For these purposes, 0.01% or more of V and/or Nb must be contained. On the other hand, even if more than 1.0% of V and/or more than 0.50% of Nb are contained, the effect saturates, and the material cost increases, so that the upper limits of the V content and the Nb content are 1.0% and 0.50%, respectively. The V content is preferably 0.10 to 0.30%, and the Nb content is preferably 0.15 to 0.28%. The containing of both of V and Nb is more elective.

P: 0.050% or Less

P (phosphorus), which is an impurity, is an element that exerts an adverse influence on the toughness and the like of steel. The P content is 0.050% or less, and is preferably as low as possible. The P content is preferably 0.025% or less, further preferably 0.018% or less.

S: 0.050% or Less

S (sulfur), which is an impurity, is an element that like P, exerts an adverse influence on the toughness and the like of steel. The S content is 0.050% or less, and is preferably as low as possible. The S content is preferably 0.010% or less, further preferably 0.005% or less.

The steel in accordance with the present invention has the above-described chemical composition, and in the steel, the balance consists of Fe and impurities. The "impurities" in the "Fe and impurities" mean components that mixed in on account of various factors in the production process, including raw materials such as ore or scrap, when a steel is produced on an industrial scale, the components being allowed to exist in the range such that they do not an adverse influence on the present invention.

The steel in accordance with the present invention can contain, as necessary, one or more kinds of components selected from at least one group of the first group to the fourth group described below. Hereunder, the components belonging to these groups are described.

The elements belonging to the first group are Mo and W. These elements have a common operational advantage of stimulating the formation and stabilization of carbo-nitrides and contributing to solid-solution strengthening. The reasons for restricting the contents of these elements are as described below.

Mo: 0.3 to 3.0%, W: 0.3 to 6.0%

Mo (molybdenum) and W (tungsten) have an effect of forming carbo-nitrides and thereby making the grains fine, and also contribute to solid-solution strengthening. Either of these elements achieves the effect when the content of each of these elements is 0.3% or more, so that these elements can be contained as necessary. However, even if these elements are contained excessively, the effect saturates. Therefore, if these elements are contained, the contents thereof should be as follows: Mo: 0.3 to 3.0%, and W: 0.3 to 6.0%.

The elements belonging to the second group are Ti, Zr, Hf, and Ta. These elements have a common operational advantage of stimulating the formation of carbo-nitrides.

Ti: 0.001 to 0.5%, Zr: 0.001 to 0.5%, Hf: 0.001 to 03%, Ta: 0.001 to 0.6%

Ti (titanium), Zr (zirconium), Hf (hafnium), and Ta (tantalum), which, like V and Nb, have an effect of forming alloy carbo-nitrides and thereby making the grains fine, can be contained as necessary. This effect can be achieved by containing 0.001% or more of each of these elements. However, even if these elements are contained excessively, the effect saturates. Therefore, the upper limits of the contents of these elements are respectively as follows: 0.5%, Zr:

0.5%, Hf: 0.3%, and Ta: 0.6%. The upper limits of contents of Ti and Zr are preferably 0.1%, further preferably 0.03%. The upper limit of the Hf content is preferably 0.08%, further preferably 0.02%. The upper limit of the Ta content is preferably 0.4%, further preferably 0.3%.

The elements belonging to the third group are B, Cu, and Co. These elements contribute to the enhancement of strength. The reasons for restricting the contents of these elements are as described below.

B: 0.0001 to 0.020%

B (boron), which makes the precipitates line, and decrease the austenite grain diameter, whereby increasing the strength, can be contained as necessary. The effect thereof is achieved when the B content is 0.0001% or higher. On the other hand, if the B content is excessive, a compound of low melting point is formed, and the hot workability may be decreased. Therefore, the upper limit of the B content is 0.020%.

Cu: 0.3 to 5.0%, Co: 0.3 to 10.0%

Cu (copper) and Co (cobalt) are austenite stabilizing elements, and contribute to the enhancement of strength due to solid-solution strengthening. Therefore, 0.3% or more or either one or both of these elements can be contained as necessary. However, because of the balance between effect and material cost, the upper limits of the contents of Cu and Co are 5.0% and 10.0%, respectively.

The elements belonging to the fourth group are Mg, Ca, La, Ce, Y, Sm, Pr, and Nd. These elements have a common action for preventing solidification cracking at the time of casting.

Mg: 0.0001 to 0.0050%, Ca: 0.0001 to 0.0050%, La: 0.0001 to 0.2%, Ce: 0.0001 to 0.20%, Y: 0.0001 to 0.40%, Sm: 0.0001 to 0.40%, Pr: 0.0001 to 0.40%, and Nd: 0.0001 to 0.50%

Mg (magnesium) and Cu (calcium), and La (lanthanum), Ce (cerium), V (yttrium), Sm (samarium), Pr (praseodymium), and Nd (neodymium) among transition metals have an action for preventing solidification cracking, at the time of casting. Therefore, one or more kinds of these elements may be contained as necessary. The effect can be achieved by containing 0.0001% or more of each a these elements. On the other hand, if these elements are contained excessively, the hot workability decreases. Therefore, the upper limits of the contents of these elements are as follows: Mg and Ca: 0.0050%, La and Ce: 0.20%, Y, Sm and Pr: 0.40%, and Nd: 0.50%.

(B) Micro-Structure of the Steel

The nitrogen used in the present invention is effective in performing solid-solution strengthening, but has an action such that the distortion at the time of deformation is localized try decreasing the stacking fault energy, and the durability against hydrogen environment embrittlement is decreased. However, by decreasing the grain diameter, both of the enhancement of strength to 800 MPa or higher and the prevention of hydrogen environment embrittlement are enabled. In order to prevent hydrogen environment embrittlement, the grain size number (ASTM E112) is No. 8 or higher, preferably No. 9 or higher, and further preferably No. 10 or higher.

In order to make the grains fine, the pinning utilizing alloy carbo-nitrides is effective. To achieve this effect, alloy carbo-nitrides having a size of 50 to 1000 nm must be contained in the number of $0.4/\mu m^2$ or larger in cross section observation. These alloy carbo-nitrides are those that contain Cr, V, Nb, Ta, and the like as principal components, and have a crystalline structure of Z phase, that is, Cr(Nb, V)(C, N) or of MX type (M: Cr, V, Nb, Mo, W, Ta, and the like, X: C, N). The alloy carbo-nitrides in the present invention are carbo-nitrides scarcely containing Fe. Even if Fe is contained, the amount of Fe is 1 atom % or less. Also, the carbo-nitrides in the present invention include those in which the content of C (carbon) is extremely tow, that is, those consisting of nitrides.

(C) Production Method

In order to make grains fine as described in (B) and to precipitate fine alloy carbo-nitrides having a desired number density, the ordinary method cannot be used. However, the steel of the present invention can be produced by successively performing the solid solution heat treatment, cold rolling, and secondary heat treatment described below.

The first solid solution heat treatment must be performed at a temperature of 1000° C. or higher, preferably 1100° C. or higher, to dissolve alloying elements sufficiently. However, if the solid solution heat treatment temperature is higher than 1200° C., the grains are coarsened extremely. Therefore, the upper limit of the solid solution heat treatment temperature is 1200° C. Hereunder, for convenience, the heat treatment temperature in the solid solution heat treatment is referred to as a "T1 temperature".

In the solid solution heat treatment in accordance with the present invention, solution treatment of a degree necessary for precipitating carbo-nitrides in the later secondary heat treatment has only to be performed, and all of the carbo-nitride forming elements need not necessarily be dissolved. The steel material having been subjected to solid solution heat treatment is preferably cooled rapidly from the solid solution heat treatment temperature. In this case, water cooling (shower water cooling or dipping) is preferable.

Also, concerning the solid solution heat treatment, an independent solid solution heat treatment step need not necessarily be provided. By performing rapid cooling after a process of hot working such as hot extrusion, the equivalent effect can be achieved. For example, rapid cooling has only to be performed after hot extrusion at about 1150° C.

Next, in order to increase the amount of precipitate nucleus of carbo-nitrides, cold rolling is performed at a cold rolling ratio such that the reduction of area is 20% or more. The upper limit of cold rolling ratio is not restricted especially. However, considering the working ratio at the time when an ordinary member is subjected to cold rolling, 90% or less of cold rolling ratio is preferable. Finally, in order to remove distortion caused by cold rolling and to making the grains fine by precipitating fine carbo-nitrides, secondary heat treatment is perforated at a temperature lower than the T1 temperature. Hereunder, for convenience, the heat treatment temperature in the secondary heat treatment is referred to as a "T2 temperature".

The T2 temperature is less than the T1 temperature. In order to make the grains finer, the upper limit of the T2 temperature is preferably made [T1 treatment temperature–20° C.], and further preferably made [T1 treatment temperature–50° C.]. Specifically, the upper limit of the T2 temperature is preferably made 1150° C., and further preferably made 1080° C. On the other hand, the lower limit of the T2 temperature is 900° C. because if the T2 temperature is lower than 900° C., coarse Cr carbides are formed, and therefore the micro-structure becomes non-uniform.

EXAMPLES

In the following, the effects of the present invention are explained based on examples.

Fifty kilograms of each of stainless steels having the chemical compositions given in Table 1 was vacuum melted and hot-forged to form a block having a thickness of 40 to 60 mm.

TABLE 1

Chemical composition (mass %, the balance being Fe)

| Steel | C | Si | Mn | P | S | Ni | Cr | V | Nb | sol.Al | N | Others | |
|---|---|---|---|---|---|---|---|---|---|---|---|---|---|
| A | 0.020 | 0.40 | 4.55 | 0.010 | 0.001 | 12.25 | 22.50 | 0.20 | 0.20 | 0.020 | 0.32 | | The |
| B | 0.010 | 0.42 | 5.80 | 0.015 | 0.001 | 13.45 | 20.58 | 0.28 | 0.15 | 0.015 | 0.36 | | invention |
| C | 0.008 | 0.43 | 4.60 | 0.009 | <0.001 | 12.55 | 22.10 | 0.12 | 0.28 | 0.017 | 0.30 | | steel |
| D | 0.005 | 0.46 | 1.12 | 0.015 | 0.001 | 12.19 | 18.31 | 0.08 | 0.05 | 0.016 | 0.20 | | |
| E | 0.015 | 0.45 | 5.80 | 0.018 | <0.001 | 11.22 | 18.53 | | 0.21 | 0.018 | 0.25 | | |
| F | 0.005 | 0.40 | 5.10 | 0.008 | 0.002 | 14.85 | 23.75 | 0.48 | | 0.025 | 0.45 | | |
| G | 0.050 | 0.35 | 6.84 | 0.020 | <0.001 | 10.25 | 15.15 | | 0.23 | 0.018 | 0.10 | | |
| H | 0.055 | 0.36 | 4.51 | 0.009 | 0.001 | 10.85 | 17.85 | 0.05 | 0.22 | 0.022 | 0.12 | | |
| I | 0.033 | 0.65 | 3.10 | 0.015 | 0.003 | 16.2 | 28.65 | 0.65 | | 0.045 | 0.42 | | |
| J | 0.025 | 0.45 | 4.75 | 0.008 | 0.001 | 12.20 | 22.10 | 0.21 | 0.10 | 0.018 | 0.31 | Mo: 2.10 | |
| K | 0.021 | 0.43 | 4.55 | 0.010 | 0.001 | 12.55 | 23.95 | 0.18 | 0.20 | 0.020 | 0.30 | Ti: 0.022 | |
| L | 0.009 | 0.43 | 5.10 | 0.012 | <0.001 | 11.80 | 20.22 | 0.10 | 0.15 | 0.028 | 0.31 | B: 0.0030 | |
| M | 0.019 | 0.46 | 5.01 | 0.009 | 0.001 | 12.05 | 23.15 | 0.19 | 0.21 | 0.019 | 0.32 | Cu: 3.5 | |
| N | 0.021 | 0.48 | 4.85 | 0.008 | 0.001 | 13.20 | 21.84 | 0.28 | 0.09 | 0.021 | 0.30 | Ca: 0.0016 | |
| O | 0.015 | 0.36 | 4.95 | 0.014 | <0.001 | 12.96 | 22.01 | 0.22 | 0.20 | 0.020 | 0.30 | Nd: 0.32 | |
| P | 0.019 | 0.44 | 5.05 | 0.015 | 0.001 | 11.85 | 22.55 | 0.18 | 0.19 | 0.022 | 0.31 | Mo: 1.95, Zr: 0.025 | |
| Q | 0.035 | 0.49 | 5.52 | 0.008 | 0.002 | 13.20 | 23.01 | 0.12 | 0.20 | 0.028 | 0.30 | W: 4.01, B: 0.0055 | |
| R | 0.022 | 0.44 | 4.88 | 0.009 | 0.001 | 12.05 | 22.20 | 0.20 | 0.15 | 0.017 | 0.33 | Mo: 2.05, Mg: 0.0025 | |
| S | 0.021 | 0.43 | 4.55 | 0.010 | 0.001 | 12.85 | 22.95 | 0.18 | 0.10 | 0.020 | 0.30 | Ta: 0.20, Cu: 4.5 | |
| T | 0.015 | 0.45 | 4.89 | 0.009 | 0.002 | 12.09 | 21.06 | 0.19 | 0.20 | 0.025 | 0.30 | B: 0.015, Ca: 0.0025 | |
| U | 0.011 | 0.44 | 4.86 | 0.010 | 0.001 | 12.08 | 20.85 | 0.15 | 0.19 | 0.020 | 0.38 | B: 0.015, Mg: 0.0041 | |
| V | 0.015 | 0.45 | 5.09 | 0.012 | 0.001 | 12.04 | 21.06 | 0.19 | 0.20 | 0.021 | 0.39 | Cu: 4.8, Ca: 0.0035 | |
| W | 0.009 | 0.48 | 4.86 | 0.008 | <0.001 | 12.07 | 20.96 | 0.26 | 0.09 | 0.019 | 0.36 | Mo: 2.15, Ti: 0.010, B: 0.0025 | |
| X | 0.010 | 0.47 | 4.99 | 0.011 | 0.001 | 12.51 | 21.48 | 0.21 | 0.15 | 0.015 | 0.32 | Mo: 1.95, Ti: 0.015, Cu: 3.7 | |
| Y | 0.016 | 0.47 | 5.21 | 0.011 | 0.001 | 12.25 | 21.59 | 0.24 | 0.18 | 0.018 | 0.30 | Mo: 2.15, Zr: 0.045, Ca: 0.0020 | |
| Z | 0.020 | 0.49 | 5.56 | 0.012 | 0.002 | 13.16 | 23.08 | 0.27 | 0.20 | 0.018 | 0.33 | Ta: 0.21, Cu: 4.2, Mg: 0.0035 | |
| 1 | 0.015 | 0.46 | 4.95 | 0.015 | <0.001 | 12.95 | 22.98 | 0.23 | 0.14 | 0.016 | 0.30 | Mo: 2.85, Ti: 0.010, Cu: 3.5, La: 0.10 | |
| 2 | 0.010 | 0.41 | 5.25 | 0.009 | 0.001 | 13.01 | 21.91 | 0.21 | 0.15 | 0.021 | 0.31 | Mo: 3.01, Ti: 0.009, Cu: 3.0, Y: 0.11 | |
| 3 | 0.011 | 0.45 | 4.91 | 0.008 | <0.001 | 12.25 | 22.05 | 0.20 | 0.13 | 0.020 | 0.30 | Mo: 2.95, Ti: 0.012, Cu: 3.4, Pr: 0.11 | |
| 4 | 0.035 | 0.44 | 2.05* | 0.008 | 0.001 | 12.51 | 21.95 | 0.23 | | 0.019 | 0.06* | | Comparative |
| 5 | 0.009 | 0.46 | 5.01 | 0.007 | 0.001 | 9.02* | 22.10 | 0.25 | | 0.018 | 0.31 | | steel |
| 6 | 0.012 | 0.49 | 5.22 | 0.012 | 0.001 | 12.35 | 30.55* | 0.23 | | 0.019 | 0.30 | | |
| 7 | 0.009 | 0.42 | 5.01 | 0.009 | 0.002 | 12.14 | 21.96 | 0.16 | | 0.023 | 0.05* | | |

*shown out of scope of the invention steel.

Thereafter, the block was hot-rolled to a predetermined thickness, and was subjected to one-hour solid solution heat treatment, cold rolling, and one-hour secondary heat treatment, whereby an 8-mm thick plate material was formed. In Table 2, the solid solution heat treatment temperature (T1 temperature) of each test No. is expressed by T1(° C.), and the secondary heat treatment temperature (T2 temperature) thereof is expressed by T2(° C.). The cold rolling ratio of each test No. is also shown in Table 2.

TABLE 2

| Test No. | Steel | T1 (° C.) | Cold rolling ratio | T2 (° C.) | Grain size No. | Number of carbo-nitrides (×10/25 µm²) | TS (MPa) | Relative rupture elongation (%) | |
|---|---|---|---|---|---|---|---|---|---|
| 1 | A | 1100 | 25 | 900 | 10.2 | 35 | 826 | 96 | The |
| 2 | A | 1100 | 40 | 1000 | 10.6 | 42 | 814 | 98 | invention |
| 3 | A | 1100 | 50 | 950 | 11.0 | 49 | 822 | 103 | |
| 4 | A | 1150 | 50 | 1050 | 10.5 | 55 | 828 | 101 | |
| 5 | A | 1150 | 25 | 1050 | 9.1 | 33 | 819 | 92 | |
| 6 | A | 1100 | 40 | 1050 | 9.6 | 41 | 821 | 93 | |
| 7 | A | 1200 | 25 | 1150 | 8.2 | 28 | 815 | 82 | |
| 8 | B | 1100 | 25 | 1000 | 10.3 | 29 | 808 | 96 | |
| 9 | C | 1100 | 25 | 1000 | 10.5 | 27 | 805 | 98 | |
| 10 | D | 1100 | 25 | 1000 | 10.3 | 20 | 812 | 92 | |
| 11 | E | 1100 | 25 | 1000 | 10.4 | 23 | 809 | 93 | |
| 12 | F | 1100 | 25 | 1000 | 10.3 | 82 | 865 | 92 | |
| 13 | G | 1100 | 25 | 1000 | 10.1 | 12 | 805 | 85 | |
| 14 | H | 1100 | 25 | 1000 | 10.5 | 15 | 812 | 86 | |
| 15 | I | 1100 | 25 | 1000 | 10.3 | 65 | 854 | 89 | |
| 16 | J | 1100 | 25 | 1000 | 10.2 | 31 | 812 | 100 | |
| 17 | K | 1100 | 25 | 1000 | 10.3 | 25 | 811 | 101 | |
| 18 | L | 1100 | 25 | 1000 | 10.3 | 29 | 808 | 98 | |
| 19 | M | 1100 | 25 | 1000 | 10.2 | 27 | 809 | 99 | |
| 20 | N | 1100 | 25 | 1000 | 10.2 | 28 | 814 | 100 | |
| 21 | O | 1100 | 25 | 1000 | 10.3 | 28 | 830 | 99 | |
| 22 | P | 1100 | 25 | 1000 | 10.3 | 25 | 815 | 104 | |
| 23 | Q | 1100 | 25 | 1000 | 10.2 | 24 | 806 | 99 | |
| 24 | R | 1100 | 25 | 1000 | 10.4 | 27 | 803 | 99 | |
| 25 | S | 1100 | 25 | 1000 | 10.3 | 34 | 830 | 98 | |
| 26 | T | 1100 | 25 | 1000 | 10.2 | 31 | 809 | 96 | |

TABLE 2-continued

| Test No. | Steel | T1 (° C.) | Cold rolling ratio | T2 (° C.) | Grain size No. | Number of carbo-nitrides (×10/25 μm²) | TS (MPa) | Relative rupture elongation (%) | |
|---|---|---|---|---|---|---|---|---|---|
| 27 | U | 1100 | 25 | 1000 | 10.2 | 58 | 825 | 95 | |
| 28 | V | 1100 | 25 | 1000 | 10.2 | 65 | 842 | 95 | |
| 29 | W | 1100 | 25 | 1000 | 10.3 | 52 | 815 | 96 | |
| 30 | X | 1100 | 25 | 1000 | 10.4 | 25 | 805 | 105 | |
| 31 | Y | 1100 | 25 | 1000 | 10.4 | 24 | 808 | 101 | |
| 32 | Z | 1100 | 25 | 1000 | 10.3 | 31 | 831 | 98 | |
| 33 | 1 | 1100 | 25 | 1000 | 10.3 | 33 | 812 | 99 | |
| 34 | 2 | 1000 | 25 | 950 | 10.9 | 25 | 813 | 101 | |
| 35 | 3 | 1000 | 25 | 950 | 10.9 | 24 | 822 | 102 | |
| 36 | A | 1250** | 40 | 1000 | 7.5* | 38 | 802 | 65 | Comparative |
| 37 | A | 950** | 40 | 1010 | 7.2* | 0.3* | 666* | 63 | |
| 38 | A | 1100 | 0** | 1000 | 6.7* | 0.2* | 654* | 53 | |
| 39 | A | 1100 | 15** | 1000 | 7.2* | 0.5* | 704* | 58 | |
| 40 | A | 1100 | 25 | 1100** | 7.8* | 31 | 805 | 75 | |
| 41 | A | 1100 | 40 | 850 | 7.5* | 0.3* | 688* | 73 | |
| 42 | 4 | 1100 | 25 | 1000 | 7.3* | 0.1* | 581* | 74 | |
| 43 | 5 | 1100 | 25 | 1000 | 10.5 | 22 | 813 | 55 | |
| 44 | 4 | 1100 | 25 | 1000 | 10.6 | 28 | 802 | 45 | |
| 45 | 7 | 1100 | 25 | 1000 | 7.7* | 0.2* | 560* | 73 | |

*shows out of scope of the invention steel.
**shows out of scope of the invention method.

A specimen was sampled and embedded with a resin so that the cross section perpendicular to the rolling direction of the plate material can be observed, and after electrolytic etching, the grain size number (in conformity to ASTM E112) was measured. Also, similarly, by using a resin embedding material in the cross section direction, the number of precipitates was measured by the observation under an electron microscope using the extraction replica method. A region of 25 μm² was observed at ×10,000 magnification in ten visual fields, and precipitates having a size of 50 to 1000 nm were measured. The precipitates measured in examples were carbo-nitrides of Z phase of rhombic structure containing Cr, V, Nb, C, N, and the like, or of MX type of tetragonal structure containing Cr, Nb, V, C, N, and the like.

A round-bar tensile test specimen having a diameter of 3 mm in its parallel part was sampled in the longitudinal direction of the plate material, and a tensile test was conducted at a strain rate of $3 \times 10^{-6}$/s in the atmosphere at normal temperature or in high-pressure hydrogen gas of 85 MPa at normal temperature to measure tensile strength (TS) and rupture elongation. Since hydrogen has a remarkable influence on the decrease in ductility, the ratio of rupture elongation in hydrogen to rupture elongation in the atmosphere was made a relative rupture elongation, and it was interpreted that if the relative rupture elongation is 80% or more, preferably 90% or more, the decrease in ductility caused by hydrogen is slight, and the resistance to hydrogen environment embrittlement is excellent.

The strain rate of $3 \times 10^{-6}$/s in the above-described tensile test is considerably lower than the strain rate of $10^{-4}$/s in the tensile test in the high-pressure hydrogen gas environment, which has been used in the conventional documents. The reason for this is that in the recent evaluation standards in durability evaluation against hydrogen environment embrittlement, the evaluation test at a very low strain rate, in which the hydrogen environment embrittlement susceptibility of austenitic stainless steel becomes higher, is recommended.

Table 2 summarized the grain size number, the number of carbo-nitrides, tensile strength (TS), and relative rupture elongation of steel being tested. Test Nos. 1 to 35 are example embodiments of the present invention, in which the grain size number was No. 8 or higher, a sufficient number of carbo-nitrides were precipitated, the TS was 800 MPa or higher, and the relative rupture elongation was also 80% or more, a sufficient resistance to hydrogen environment embrittlement being attained.

Test Nos. 36 to 41 are comparative examples. In test No. 36, the solid solution heat treatment temperature T1 was too high, the grains were coarsened, and the resistance to hydrogen environment embrittlement was poor. In test No. 37, the solid solution heat treatment temperature T1 was too low, the number density of carbo-nitrides was low, the grains were coarsened, and the resistance to hydrogen environment embrittlement was poor. In test Nos. 38 and 39, the cold rolling ratio was low, the precipitation number of carbo-nitrides was insufficient, the grains were coarsened, and the resistance to hydrogen environment embrittlement was poor. In test No. 40, the secondary heat treatment temperature T2 was too high, the grains were coarsened, and the resistance to hydrogen environment embrittlement was poor. In test No. 41, the final solid solution heat treatment temperature T2 was too low, the number density of carbo-nitrides was low, the grains were coarsened, and the resistance to hydrogen environment embrittlement was poor.

Test Nos. 42 to 45 are comparative examples, in which the chemical composition of steel material was out of the range of the present invention. In test No. 42, the Mn content was too low, and resultantly N (nitrogen) could not be contained sufficiently, the grains were coarsened, the strength was low, and the resistance to hydrogen environment embrittlement was poor. In test No. 43, the Ni content was low, δ ferrite was formed, and the resistance to hydrogen environment embrittlement was poor. In test No. 44, the Cr content was high, coarse Cr carbides were formed, and the resistance to hydrogen environment embrittlement was poor. In test No. 45, the N (nitrogen) content was low, the grains were coarsened, the strength was low, and the resistance to hydrogen environment embrittlement was poor.

INDUSTRIAL APPLICABILITY

As described above, according to the present invention even an austenitic stainless steel containing less than 7% of Mn can be made a high-strength steel excellent in hydrogen environment embrittlement property by interposing a cold rolling step between two heat treatments, and therefore can be used for pipes and containers for high-pressure hydrogen gas.

The invention claimed is:

1. A method of manufacturing an austenitic stainless steel for hydrogen gas, wherein the tensile strength is 800 MPa or higher, a relative rupture elongation is 80% or more, the grain size number in accordance with ASTM E112 is No. 8 or higher, and alloy carbo-nitrides having a maximum diameter of 50 to 1000 nm are contained in the number of 0.4/$\mu m^2$ or larger in cross section observation, comprising the following steps (a) to (d):
   (a) preparing an austenitic stainless steel that has the chemical composition comprising, by mass percent, C: 0.10% or less, Si: 1.0% or less, Mn: 3% or more to less than 7%, Cr: 15 to 24%, Ni: 10 to 15%, Al: 0.001 to 0.10%, N: 0.10 to 0.50%, and V: 0.01 to 1.0%, the balance being Fe and impurities, wherein in the impurities, the P content is 0.050% or less and the S content is 0.050% or less,
   (b) subjecting the prepared austenitic stainless steel to a solid solution heat treatment at a temperature of 1000 to 1200° C.,
   (c) subjecting the heat treated austenitic stainless steel to a cold rolling in which the reduction of area is 20% or more, and
   (d) subjecting the cold-rolled austenitic stainless steel to a heat treatment in the temperature range of 900° C. or higher and lower than the solution treatment temperature.

2. The method of manufacturing an austenitic stainless steel according to claim 1, characterized in the step (c) being subjecting the heat treated austenitic stainless steel to a cold rolling in which the reduction of area is 20 to 90%.

3. The method of manufacturing an austenitic stainless steel according to claim 1, characterized in the step (d) being subjecting the cold-rolled austenitic stainless steel to a heat treatment in the temperature range of 900 to 1150° C.

4. A method of manufacturing an austenitic stainless steel for hydrogen gas, wherein the tensile strength is 800 MPa or higher, a relative rupture elongation is 80% or more, the grain size number in accordance with ASTM E112 is No. 8 or higher, and alloy carbo-nitrides having a maximum diameter of 50 to 1000 nm are contained in the number of 0.4/$\mu m^2$ or larger in cross section observation, comprising the following steps (a) to (d):
   (a) preparing an austenitic stainless steel that has the chemical composition comprising, by mass percent, C: 0.10% or less, Si: 1.0% or less, Mn: 3% or more to less than 7%, Cr: 15 to 24%, Ni: 10 to 15%, Al: 0.001 to 0.10%, N: 0.10 to 0.50%, and V: 0.01 to 1.0%, further containing Nb: 0.01 to 0.50%, and/or containing one or more elements of at least one group selected from element groups of a first group to a fourth group described below, the balance being Fe and impurities, wherein in the impurities, the P content is 0.050% or less and the S content is 0.050% or less:

first group elements . . . Mo: 0.3 to 3.0% and W: 0.3 to 6.0%,
   second group elements . . . Ti: 0.001 to 0.5%, Zr: 0.001 to 0.5%, Hf: 0.001 to 0.3%, and Ta: 0.001 to 0.6%,
   third group elements . . . B: 0.0001 to 0.020%, Cu: 0.3 to 5.0%, and Co: 0.3 to 10.0%,
   fourth group elements . . . Mg: 0.0001 to 0.0050%, Ca: 0.0001 to 0.0050%, La: 0.0001 to 0.20%, Ce: 0.0001 to 0.20%, Y: 0.0001 to 0.40%, Sm: 0.0001 to 0.40%, Pr: 0.0001 to 0.40%, and Nd: 0.0001 to 0.50%,
   (b) subjecting the prepared austenitic stainless steel to a solid solution heat treatment at a temperature of 1000 to 1200° C.,
   (c) subjecting the heat treated austenitic stainless steel to a cold rolling in which the reduction of area is 20% or more, and
   (d) subjecting the cold-rolled austenitic stainless steel to a heat treatment in the temperature range of 900° C. or higher and lower than the solution treatment temperature.

5. The method of manufacturing an austenitic stainless steel according to claim 4, characterized in the step (c) being subjecting the heat treated austenitic stainless steel to a cold rolling in which the reduction of area is 20 to 90%.

6. The method of manufacturing an austenitic stainless steel according to claim 4, characterized in the step (d) being subjecting the cold-rolled austenitic stainless steel to a heat treatment in the temperature range of 900 to 1150° C.

* * * * *